H. STEVENSON.
Towing Canal-Boats.
No. 213,076. Patented Mar. 11, 1879.
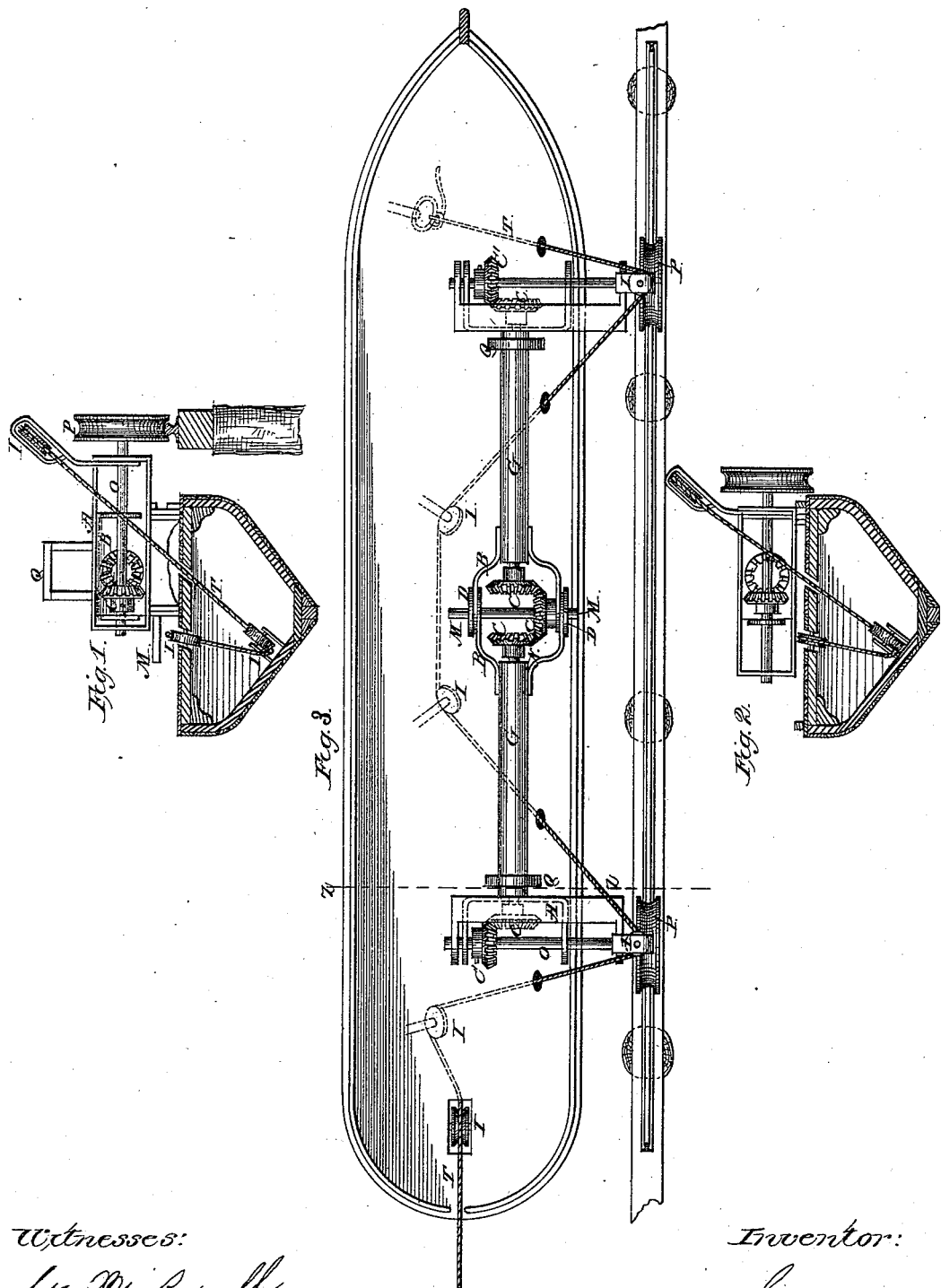
Witnesses:
Geo. W. Burnell.
James P. Jenson.
Inventor:
Hugh Stevenson

UNITED STATES PATENT OFFICE.

HUGH STEVENSON, OF OSHKOSH, WISCONSIN.

IMPROVEMENT IN TOWING CANAL-BOATS.

Specification forming part of Letters Patent No. 213,076, dated March 11, 1879; application filed August 13, 1878.

*To all whom it may concern:*

Be it known that I, HUGH STEVENSON, of Oshkosh, county of Winnebago, and State of Wisconsin, have invented a new and useful Improvement in Traction Devices for Canal-Boats; and I do hereby declare that the following is a description thereof, reference being had to the accompanying drawings, in which—

Figure 1 is a cross-section and partial elevation of the boat and traction device on line $zz$, Fig. 3. Fig. 2 is a rear section and partial elevation, showing the frame which carries the traction-wheels in its inboard position. Fig. 3 is a plan of the deck of the boat, the side track, and the traction device.

Similar letters of reference designate corresponding parts throughout.

This invention is an improvement on the device secured to me by Letters Patent No. 150,441, of May 5, 1874, and the construction of the several parts of the improvement will be hereinafter pointed out and claimed.

In the drawings, M is a shaft, driven in any suitable way. This shaft extends partly across the deck, is supported in boxes D D, and serves as a trunnion or pivotal point for the yokes B B, which, in turn, support one end of two shafts, G G. On the shaft M is a bevel-wheel, C, which gears into corresponding wheels on shafts N, which shafts are at right angles to the driving-shaft M and pass through shaft G, or parallel thereto. At the outer ends of shafts N are other bevel-wheels, which mesh into gears on shafts O, which carry the traction-wheels.

The bevel-gears C on shafts O are adjustable lengthwise of said shaft, so that they may always be in mesh with the gears on shafts N, if desired, no matter how far the shafts O may extend outboard.

The shafts O are supported in suitable frames A, which move laterally with reference to the shafts G and the boat, so as to project more or less over the side. A cross-head on the end of shaft G, or other similar device, permits this movement of frame A. To the ends of these frames A are secured sheaves or pulleys I, around which a line may pass. Other pulleys I are placed below deck amidships, or in other suitable positions, so that the line T may pass around all these sheaves.

It will be seen that a draft or pull on the line T will have a tendency to pull down the traction-wheels P firmly upon the track, and hold them in close contact therewith.

When the outer ends of shaft G are swung up they are guided by the frames Q, as in my former patent.

It will thus be seen that when shaft M is revolved by the engine or other power it will revolve the shafts N and O and the traction-wheels P upon the track.

When it is desired to draw the wheels P inboard it can be done by sliding the frames A; and the frames A and their shafts and wheels are free to rise by reason of the shafts G being mounted on pivots or trunnions.

Having thus described my invention, what I claim as new, and desire to secure by Letters Patent, is—

1. The combination of the pivoted shafts G and the sliding frames A, carrying the shafts and traction-wheels, substantially as described.

2. The combination of the pivoted shafts G, sliding frames A, shafts O, and the bevel-gears C, adjustable longitudinally on said shafts, as set forth.

3. The combination of the pivoted shafts G, frames A, and the line T, by which the frames and their traction-wheels are brought into closer contact with the track, as set forth.

HUGH STEVENSON.

Witnesses:
 JAMES P. JENSON,
 CHAS. F. HARDY.